United States Patent [19]

Baba

[11] Patent Number: 4,640,084
[45] Date of Patent: Feb. 3, 1987

[54] MOWING APPARATUS
[75] Inventor: Toru Baba, Yokosuka, Japan
[73] Assignee: Kioritz Corporation, Tokyo, Japan
[21] Appl. No.: 698,538
[22] Filed: Feb. 5, 1985
[30] Foreign Application Priority Data Feb. 7, 1984 [JP] Japan .................... 59-15886[U]

[51] Int. Cl.⁴ .................. A01D 34/67; A01G 3/06
[52] U.S. Cl. ................................ 56/12.7; 30/276
[58] Field of Search ............ 56/12.7; 30/276, 347
[56]        References Cited
        U.S. PATENT DOCUMENTS

| 4,024,635 | 5/1977 | Mizuno et al. | 56/12.7 |
| 4,035,912 | 7/1977 | Ballas et al. | 30/276 |
| 4,189,833 | 2/1980 | Kwator | 56/12.7 |
| 4,202,094 | 5/1980 | Kalmar | 56/12.7 |
| 4,203,212 | 5/1980 | Proulx | 56/12.7 |
| 4,209,902 | 7/1980 | Moore et al. | 56/12.7 |
| 4,250,623 | 2/1981 | Pittinger et al. | 56/12.7 |
| 4,282,653 | 8/1981 | Comer et al. | 56/12.7 |
| 4,366,621 | 1/1983 | Mitchell | 56/12.7 |
| 4,490,910 | 1/1985 | Mattson et al. | 30/276 |

FOREIGN PATENT DOCUMENTS

| 0051175 | 5/1982 | European Pat. Off. . |
| 556632 | 10/1974 | Switzerland . |
| 2115665 | 9/1983 | United Kingdom . |

Primary Examiner—Paul J. Hirsch
Attorney, Agent, or Firm—Browdy and Neimark

[57]            ABSTRACT

A mowing apparatus including an elastic band enclosing the outer periphery of a coil of cord wound on a spool in a casing.

2 Claims, 2 Drawing Figures

MOWING APPARATUS

BACKGROUND OF THE INVENTION

This invention relates to mowing apparatus, and more particularly it is concerned with a mowing apparatus having improved means for holding a cord serving as a cutter.

In a mowing apparatus utilizing a nylon cord as a cutter, the nylon cord wound on a spool in a rotary casing has an end portion drawn out from an opening of the rotary casing in a suitable length during mowing operations. In the event that the cord is broken, the rotational speed of the rotary casing is reduced or the rotary casing stops rotating during mowing operations, the cord wound on the spool might become loosened by its own resilience and the portion of the cord drawn out from the casing might be pulled into the casing if the portion of the cord drawn out from the casing through the opening were small in length, thereby making it difficult to draw the cord again from the casing.

To cope with the situation described hereinabove, it has hitherto been usual practice to fit a sponge ring of the doughnut shape over the periphery of the cord wound on the spool, to thereby prevent the wound cord from being loosened. The use of the sponge ring has raised the problem that the large space occupied by the sponge ring in the casing makes it necessary to increase the size of the casing more than is necessary as contrasted to the amount of the cord mounted in the casing, thereby making it impossible to obtain an overall compact size in a mowing apparatus. Another problem raised by the prior art is that the sponge ring has been unable to stably hold the cord in preventing its loosening.

SUMMARY OF THE INVENTION

This invention has been developed for the purpose of obviating the aforesaid problem of the prior art. Accordingly, the invention has as its object the provision of a mowing apparatus having improved means for holding the cord wound on the spool in the casing which is simple in construction and yet enables loosening of the cord to be positively avoided without occupying a large space in the casing, thereby making it possible to obtain an overall compact size in a mowing apparatus.

The outstanding characteristic of the invention enabling the aforesaid object to be accomplished is that an elastic band capable of expansion and contraction is used as holding means which encloses the outer periphery of the cord serving as a cutter wound on the spool.

The use of the holding means according to the invention makes it possible to positively avoid inadvertent or unnecessary loosening of the cord wound on the spool because the cord is firmly held at the outer periphery by the elastic holding means. When the holding means according to the invention is used, the space in the casing can be reduced and the casing can be produced at low cost and manufactured and used without any trouble. Thus, the invention can achieve the effect of providing an inexpensive mowing apparatus of small size and light weight.

DESCRIPTION OF THE PREFERRED EMBODIMENT

Figure 1:
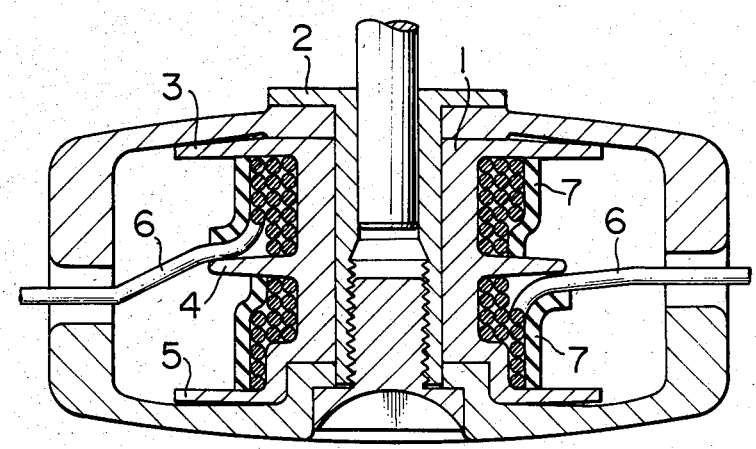
FIG. 1 is a sectional view of the casing of the mowing apparatus comprising one embodiment of the invention.
Figure 2:
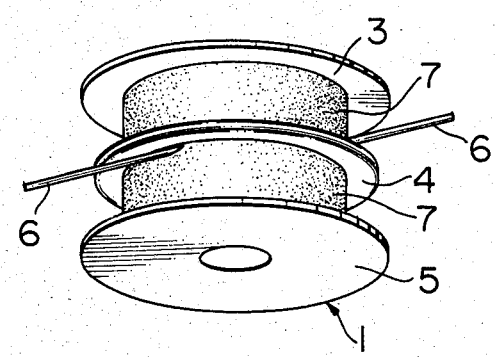
FIG. 2 is a perspective view of the spool shown in FIG. 1.

FIGS. 1 and 2 show the mowing apparatus according to the invention, particularly the spool section of the apparatus. As shown, a spool 1 is located substantially in a central portion of a casing about a boss 2, and rotates with the boss 2 as a unit. The spool 1 has three annular flanges 3, 4 and 5 to define two annular groove sections separated vertically by the annular flage 4. In each of the two groove sections, a coil of cord 6 formed as of nylon wound on the spool 1 has its end portion drawn out in a suitable length from the casing through an opening formed at a peripheral wall of the casing to perform a mowing operation.

The coil of the cord 6 wound on the spool 1 which is located in each annular groove section is enclosed at its outer periphery by an annular rubber band 7 of a width larger than the width of the coil, and which is smaller in diameter than the coil of cord 6 wound on the spool 1. The coil of cord 6 is hold by the elasticity of the rubber band 7 against the spool 1, thereby preventing the coil of cord 6 from being loosened. The width of the annular rubber band 7 is substantially equal to but slightly larger than the width of each annular groove section of the spool 1 so that when in position over the coil as illustrated, the band 7 can conform to irregularities in the coil surface without becoming shorter than the width of the annular groove. In the embodiment shown and described herein, an end portion of the cord 6 is pulled out by forcing and end of the rubber band 7 to move away from the flange 4 to form a gap therebetween, to be drawn out from the casing to outside. It is to be understood that the invention is not limited to the specific width of the rubber band shown and described herein. What is essential is that the width of the rubber band 7 is large enough to satisfactorily hold the coil of cord 6 in position on the spool 1. The same effect can be achieved by using more than two rubber bands for holding the coil of cord 6 located in one annular groove section by arranging the rubber bands either in parallel or superposed relation to each other. Also, the material of the elastic band 7 is not limited to rubber, and any other suitable material having elasticity may be used in place of rubber. Although the elastic band has been described as being annular in shape, it may be a member of any shape formed with slits extending widthwise thereof.

The use of the holding means of the aforesaid construction according to the invention minimizes the space in the casing which is occupied by the holding means. This enables the size of the casing to be reduced. Thus the mowing apparatus according to the invention is inexpensive and easy to manufacture while being positively able to prevent loosening of the cord wound on the spool in the casing.

What is claimed is:

1. A mowing apparatus comprising:
   a casing containing a cord having a free end serving as a cutter;

a spool defined by a cylindrical portion and a pair of circular side flanges, said spool having at least one coil of the cord wound thereon; wherein the improvement comprises:

holding means comprising an elastic band enclosing an outer periphery of the coil of the cord wound on the spool, said elastic band having in its free unstretched state a larger width and a smaller outer diameter than the coil, said free end of said cord extending from said coil between one of said pair of circular side flanges and an edge of said elastic band.

2. A mowing apparatus as claimed in claim 1, wherein said holding means comprises a rubber band.

* * * * *